Patented Mar. 15, 1938

2,111,509

UNITED STATES PATENT OFFICE 2,111,509

PRODUCTION OF ESTERS OF METHACRYLIC ACID

Donald J. Loder, Wilmington, Del., assignor to E. I. du Pont de Nemours & Company, Wilmington, Del., a corporation of Delaware No Drawing. Application February 16, 1932, Serial No. 593,411

9 Claims. (Cl. 260—106)

This invention relates to a process for the preparation of esters of the unsaturated monocarboxylic aliphatic organic acids and more particularly to the preparation of acrylic and methacrylic (alphamethyl acrylic) acid esters from propionic and isobutyric acids.

According to the present invention the esters of the unsaturated acids may be obtained, in the following manner. The saturated monocarboxylic acid is first halogenated, in order to substitute for one or more of its hydrogen atoms, a halogen atom. The thus halogenated acid is then esterified, by means of an alcohol, to give an ester of the saturated halogenated acid. Subsequent to esterification, the halogenated ester is dehydrohalogenated (hydrogen halide is split off) whereupon an unsaturated linkage is formed within the molecule and an ester, of an unsaturated monocarboxylic aliphatic organic acid, is obtained. While I prefer, generally, to prepare the ester in the above manner, an alternate method, in some instances, may be employed. Subsequent to halogenation, the compound is dehydrohalogenated and then esterified. This alternate procedure is not usually as applicable as the former, with equally advantageous results, due to the fact that a number of the unsaturated acids are not as stable per se as the ester of those acids. Accordingly, by arranging the steps of the process in my preferred manner the unsaturated acid is never present as such and when the unsaturated linkage is produced, it is produced in the ester.

I will now describe several examples illustrating my process but it will be understood that I will not be limited by the details thereof.

Example 1.—Isobutyric acid containing 10% by weight of sulfur was heated for 6½ hours at approximately 130° C. while an excess of chlorine gas was passed into the liquor. A product containing the following compounds was obtained:

|  | Percent |
|---|---|
| Alpha chlorisobutyryl chloride | 17.9 |
| Alpha chlorisobutyric acid | 40.7 |
| Alpha chlorisobutyric anhydride | 13.9 |
| Beta chlorisobutyric acid | 19.6 |
| Unconverted and lost | 6.9 |

One hundred parts by volume of the above product was then refluxed at atmospheric pressure, in the presence of one part of sulfuric acid, with 160 parts of methanol. Esterification was substantially completed at the end of two hours and the esterified and chlorinated acid was then distilled from the side products of the esterification. The thus esterified and chlorinated isobutyric acid was then vaporized and passed at atmospheric pressure and a temperature of 300° C. over a silica gel catalyst. 25% of the chlorinated ester was converted to the unsaturated ester. This ester, the methyl ester of methacrylic acid, has a boiling point of 100° C.

Example 2.—A rapid stream of chlorine gas was passed thru propionic acid contained in a pyrex flask, which was radiated with a 100 watt lamp during 3½ hours; the following chlorinated compounds were obtained:

|  | Percent |
|---|---|
| Alpha chlorpropionic acid | 34.0 |
| Beta chlorpropionic acid | 39.6 |
| Alpha beta chlorpropionic acid | 26.4 |

The beta-chlorpropionic acid was then separated from the above mixture by fractional distillation under reduced pressure, its boiling point at 15–20 millimeters of mercury pressure is 101–110° C., while the boiling point of the alpha is 89–95° C. under the same pressure. The alpha-beta-dichlor acid remained in the residue. The beta-chlorpropionic acid was then dechlorinated, —one part of beta-chlorpropionic acid and two parts of water being vaporized and, at a temperature of 300° C. and a pressure of one atmosphere, passed over a silica gel catalyst. The acrylic acid was extracted, from the condensed products of the dechlorination process, with ether, the ether dried, and removed from the acid by distillation. One hundred parts of the acrylic acid were then refluxed with 130 parts of methanol in the presence of 1% sulfuric acid and the methyl ester of acrylic acid formed, after refluxing for one hour, was separated by distillation. It has a boiling point of 80° C.

Any modification of my invention will come within the scope thereof without sacrificing any of the advantages that may be derived therefrom.

I claim:

1. A process for the preparation of an alkyl ester of methacrylic acid which comprises halogenating isobutyric acid in the alpha position, esterifying the thus halogenated acid, and subsequently catalytically dehydrohalogenating the esterified and halogenated acid to give the alkyl ester of methacrylic acid.

2. A process for the preparation of an alkyl ester of methacrylic acid by the following sequence of steps: (1) chlorinating isobutyric acid in the alpha position, (2) esterifying the thus halogenated isobutyric acid, and (3) catalytically dehydrohalogenating the resultant ester to produce the corresponding ester of methacrylic acid.

3. A process for the preparation of methyl ester of methacrylic acid by the following sequence of steps: (1) halogenating isobutyric acid in the alpha position, (2) esterifying the thus halogenated isobutyric acid with methyl alcohol, and (3) catalytically dehydrohalogenating the resultant methyl ester to produce the methyl ester of methacrylic acid.

4. Process for the preparation of methyl ester of methacrylic acid which comprises chlorinating isobutyric acid in the presence of a sulfur catalyst, heating, and thereby esterifying the resultant mixture with methanol in the presence of sulfuric acid, separating the products other than chlor ester by distillation, and dehydrohalogenating the chlor ester in the presence of a dehydrohalogenating catalyst.

5. Process for the preparation of methyl ester of methacrylic acid which comprises chlorinating isobutyric acid in the presence of a sulfur catalyst, at a temperature of about 130° C., heating, and thereby esterifying the resultant mixture with methanol in the presence of sulfuric acid, separating the products other than chlor ester by distillation, and dehydrohalogenating the chlor ester by passing it in the vapor state in contact with silica gel at a temperature of about 300° C.

6. A process for the preparation of methyl methacrylate which comprises halogenating isobutyric acid in the presence of sulfur at a temperature of approximately 130° C. with an excess of chlorine gas, refluxing the resulting alpha chlorisobutyric acid with methanol in the presence of sulfuric acid and subsequently dehydrohalogenating the alphachlorinated isobutyric acid at a temperature of approximately 300° C. to give methyl methacrylate.

7. A process for the preparation of an alkyl ester of methacrylic acid by the following sequence of steps: (1) Halogenating isobutyric acid in the alpha position in the presence of a halogenation catalyst, (2) esterifying the thus halogenated isobutyric acid in the presence of an esterification catalyst, and, (3) catalytically dehydrohalogenating the resultant ester to produce the corresponding ester of methacrylic acid in the presence of a dehydrohalogenating catalyst.

8. A process for the preparation of methyl methacrylate by the following sequence of steps: (1) Halogenating isobutyric acid in the alpha position in the presence of a sulfur catalyst, (2) heating and thereafter esterifying the thus halogenated isobutyric acid with methanol in the presence of sulfuric acid, and, (3) catalytically dehydrohalogenating the resultant ester in the presence of a silica gel catalyst to produce methyl methacrylate.

9. Process for the preparation of methyl methacrylate which comprises chlorinating isobutyric acid in the presence of a halogenating catalyst, heating, and thereby esterifying the resulting mixture with methanol in the presence of an esterifying catalyst, separating the products other than chlor ester by distillation, and dehydrohalogenating the chlor ester in the presence of a dehydrohalogenating catalyst.

DONALD J. LODER.